No. 686,329.  
R. K. POLLOCK.  
FRUIT OR VEGETABLE CRATE.  
(Application filed Aug. 31, 1901.)  
Patented Nov. 12, 1901.

(No Model.)

WITNESSES:
Frank G. Martin
J. E. MacGowan

INVENTOR:
Robert K. Pollock

UNITED STATES PATENT OFFICE.

ROBERT K. POLLOCK, OF CHATTANOOGA, TENNESSEE.

FRUIT OR VEGETABLE CRATE.

SPECIFICATION forming part of Letters Patent No. 686,329, dated November 12, 1901.

Application filed August 31, 1901. Serial No. 74,049. (No model.)

*To all whom it may concern:*

Be it known that I, ROBERT KELLY POLLOCK, a citizen of the United States, residing at Chattanooga, in the county of Hamilton and State of Tennessee, have invented new and useful Improvements in Fruit or Vegetable Crates or Boxes for General Uses, of which the following is a specification.

My invention relates to improvements in a fruit and vegetable crate or box for general uses; and the object of my improvement is to lessen the labor, and consequently the cost, of constructing a fruit and vegetable crate or box for general uses.

The chief feature of my invention is the manner of the construction of the component parts of the crate or box, which permits of the crate or box being quickly erected without the driving of a single nail; but in order to make it absolutely secure eight nails or staples may be driven into it after the component parts are connected with each other.

In order to understand the present manner of manufacturing fruit-crates, it may be of value to state that they are not erected at the factory. They are sold in disconnected parts to the grower or shipper, and in order to erect them or get them in readiness for use they must be put together with from forty to fifty nails, which requires a great deal of labor and expense. The present fruit-crate in universal use is sold to the user in eight pieces—namely, two sides, one top and three bottom pieces, and two end pieces. Now in order to erect a crate with these pieces the user is compelled to nail the top, three bottom pieces, and the two sides onto the two end pieces. My invention does away with at least two-thirds of the labor necessary to build the crate now in universal use.

I attain the object of my invention by the means illustrated in the accompanying drawings.

Figure 1:
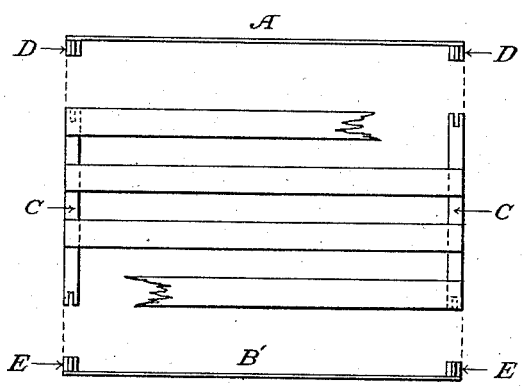
Figure 2:
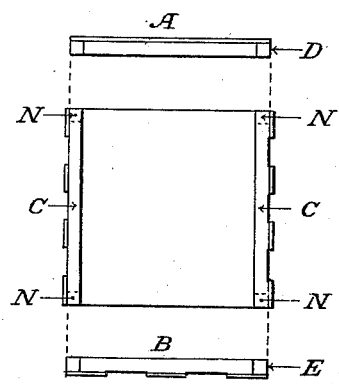
Figure 3:
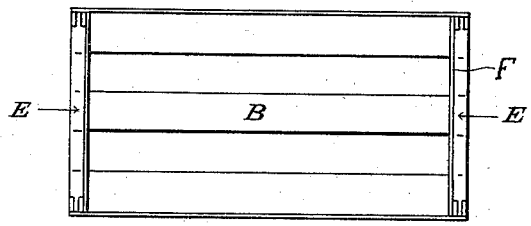
Figure 6:
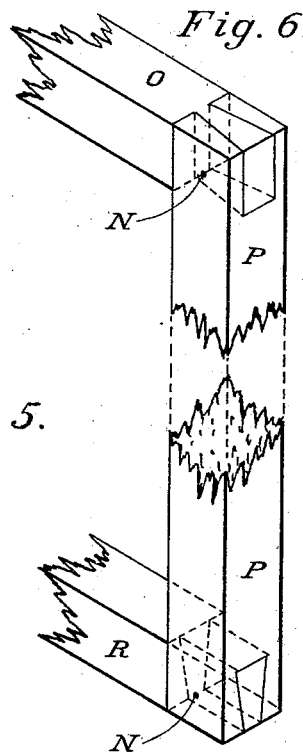
Figure 4:
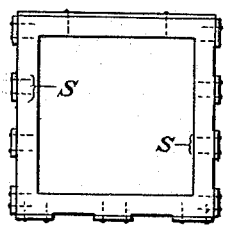
Figure 5:
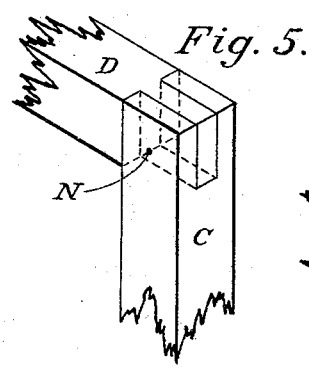

Figure 1 shows a side view of my crate, the top and bottom being shown detached. Fig. 2 is an end view of my crate, the top and bottom being shown detached. Fig. 3 is a horizontal cross-sectional view of my crate. Fig. 5 shows a view of two batten-strips, one provided with a tenon and the other with a mortise adapted to interlock therewith and to be fastened by nails or the like. Fig. 6 shows a view of two batten-strips, one having a dovetail tenon and the other a dovetail mortise adapted to interlock therewith. Fig. 4 is an end view of the crate now in universal use.

Similar letters refer to similar parts throughout the several views.

The side view, Fig. 1, shows two batten-strips C, connected by cross-strips B, secured at their ends to the batten-strips. In the illustration, A is the top, having the batten-strips D, connected by cross-strips B, secured at their ends to the batten-strips. B' is the bottom of my crate, having two batten-strips E, connected by cross-strips B, secured at their ends to the batten-strips, and the dotted lines show how the top and bottom having tenons upon the batten-strips interlock with the sides having mortises upon the batten-strips. These four walls form the main body of my crate, and they are placed together by knocking the tenon into the mortise, or vice versa. The crate thus erected is quite substantial; but to fasten it more securely four nails may be driven in at the point of interlock of the batten-strips through the tenons and mortises, as shown in Figs. 5 and 6, the nails being designated by the letter N.

The ends of my crate consist each of an integral plate or sheet (designated by the letter F in Fig. 3) adapted to be positioned against the inner face of the interlocked batten-strips and to be held in place merely by the contents of the crate. There is no nailing whatever of the ends of my crate.

Now as to the present fruit-crate in universal use, an end view of which is shown in Fig. 4, it will be observed that there are twenty-four nails in this end, or in the two ends of the crate there would be forty-eight nails. The two ends of the old crate disconnected from the sides, bottom pieces, and top are furnished to the consumer fastened together, (there being almost as many nails in them as in the balance of the crate,) and then to erect a crate it is necessary to expend much labor in driving forty-eight nails through the two sides, the top, and the three bottom pieces; so where I save labor and expense by my invention is in providing four walls of the crate with batten-strips fastened thereto and only calling for, though not absolutely requiring, the driving of four nails in each end or eight nails altogether to secure the crate after the walls have been placed together without the use of nails.

Now as to Fig. 6 as contrasted with Fig. 5, showing an ordinary tenon-and-mortise joint, that view shows how the batten-strips connected to the four walls may be interlocked by a dovetail mortise and tenon in the batten-strips. The batten-strip O has a dovetail tenon, and it will be secured to one wall of the crate. The batten-strip P has a dovetail mortise, which is made in such a manner that it will be impossible to pull the other batten-strip out of the mortised strip lengthwise, though it can be easily removed upward to permit the opening of the crate. The batten-strip R is connected to the bottom wall of the crate, and it has a dovetail tenon which interlocks with the mortise of the batten-strip P, the dovetail mortise in the latter piece being cut in such a manner that the other batten-strip R cannot be pushed out of the bottom of the mortise, though it can be pushed out lengthwise. The interlocking of the batten-strips that way imparts strength to the bottom wall on which the weight of the contents of the crate rest.

What I claim as my invention, and desire to secure by Letters Patent, is—

In a knockdown crate, four walls constructed each of two batten-strips connected by cross-strips secured at their ends to the batten-strips, the batten-strips of two walls being provided with a tenon and the batten-strips of the other two walls being provided with a mortise adapted to interlock therewith, and two remaining walls consisting each of an integral plate or sheet adapted to be positioned against the inner face of the interlocked batten-strips and to be held in place by the contents of the crate.

ROBERT K. POLLOCK.

Witnesses:
FRANK G. MARTIN,
R. E. PRITCHARD.